US012510388B2

(12) United States Patent
Däscher et al.

(10) Patent No.: US 12,510,388 B2
(45) Date of Patent: Dec. 30, 2025

(54) RESPIRATORY FLOW SENSOR

(71) Applicant: IMTMEDICAL AG, Buchs SG (CH)

(72) Inventors: Jakob Däscher, Fläsch (CH); Harri Friberg, Mauren (LI)

(*) Notice: Subject to any disclaimer, the term of this patent is extended or adjusted under 35 U.S.C. 154(b) by 768 days.

(21) Appl. No.: 17/262,578

(22) PCT Filed: Jul. 25, 2019

(86) PCT No.: PCT/IB2019/056367
§ 371 (c)(1),
(2) Date: Jan. 22, 2021

(87) PCT Pub. No.: WO2020/021492
PCT Pub. Date: Jan. 30, 2020

(65) Prior Publication Data
US 2021/0231476 A1  Jul. 29, 2021

(30) Foreign Application Priority Data
Jul. 27, 2018 (EP) .................... 18185994

(51) Int. Cl.
G01F 1/40 (2006.01)
A61B 5/087 (2006.01)

(52) U.S. Cl.
CPC ............. G01F 1/40 (2013.01); A61B 5/087 (2013.01)

(58) Field of Classification Search
CPC ............. G01F 1/40; G01F 1/36; A61B 5/087
See application file for complete search history.

(56) References Cited

U.S. PATENT DOCUMENTS 4,993,269 A * 2/1991 Guillaume ............... G01F 1/36
73/861.53
6,308,706 B1 10/2001 Lammers et al.
2009/0056472 A1 3/2009 Todokoro et al.

FOREIGN PATENT DOCUMENTS

DE 102010040287 A1 * 3/2011 ............. A61B 5/087
DE 202017102703 U1 * 7/2017 ............... G01F 1/36

OTHER PUBLICATIONS

English-language machine translation of DE-102010040287-A1 (Year: 2023).*
English-language machine translation of DE-202017102703-U1 (Year: 2023).*

* cited by examiner

Primary Examiner — Andrey Shostak
(74) Attorney, Agent, or Firm — Finch & Maloney PLLC

(57) ABSTRACT

The invention relates to a respiratory flow sensor comprising a flow tube, which has a longitudinal axis, a first flow tube portion and a second flow tube portion, comprising a flow resistor, which is disposed between the first flow tube portion and the second flow tube portion in the flow channel, and comprising two ports for extracting the pressure difference generated by the flow resistor. The first port opens into the first flow tube portion via a first connecting line and said first port is disposed at the first flow tube portion. The second port opens into the second flow tube portion via a second connecting line and said second port is disposed at the second flow tube portion. The ports each comprise a connecting line portion, which extends substantially parallel to the longitudinal axis of the flow tube. The openings of the ports are aligned in the same direction.

20 Claims, 8 Drawing Sheets

RESPIRATORY FLOW SENSOR

The invention relates to a respiratory flow sensor according to the preamble of claim 1, a respiration adapter according to the preamble of claim 10 and a method for the production of a respiratory flow sensor according to claim 12.

Respiratory flow sensors, also referred to as differential pressure flow sensors, flow measurement sensors or flow sensors, are arranged between a tube proceeding from a respiratory device or an anesthesia machine and a tube fed to the patient.

A respiratory flow sensor is known from U.S. Pat. No. 4,403,514 A, which comprises a flow tube which has a longitudinal axis, a first flow tube portion and a second flow tube portion and tube ports for tubes in the region of the free ends. A flow resistor is arranged in the flow tube between the first flow tube portion and the second flow tube portion. Furthermore, radially projecting ports are provided for extracting the pressure difference generated by the flow resistor. Connecting tubes are provided at these ports, which can be connected to a measuring device. A port is arranged at the first flow tube portion and opens into the first flow tube portion via a first connecting line. A further port is arranged at the second flow tube portion and opens into the second flow tube portion via a second connecting line.

A drawback with this known solution is that connecting lines arranged at the ports can kink, which possibly leads to falsification of the measurement results.

A respiratory flow sensor is known from CH 701 755 B1, which comprises a flow tube which has a longitudinal axis, a first flow tube portion and a second flow tube portion. A resistor is arranged in the flow tube between the first flow tube portion and the second flow tube portion. Furthermore, ports for extracting the pressure difference generated by the flow resistor are provided. A first port opens into the first flow tube portion via a first connecting line and a further port opens into the second flow tube portion via a second connecting line. The ports are both arranged at the first flow tube portion. The ports each comprise a connecting line portion of the connecting line that runs parallel to the longitudinal axis of the flow tube. The openings of the ports are aligned in the same direction.

The drawback with this known solution is that, for the formation of the connecting lines from the ports into the corresponding flow tube portions, not only radially, i.e. outwardly, projecting flange continuations have to be provided, but also expensive design and production-related measures are required in the design of the sealing means to ensure tight connections. Only in this way can an air short-circuit be prevented that would lead to highly falsified measurement results when the respiratory flow sensor is used.

DE 20 2017 102 703 U1 shows a flow sensor, which has a longitudinal axis, a first tube element and a second tube element. Furthermore, the flow sensor comprises a flow resistor, which is arranged in the flow tube between the first tube element and the second tube element. Extension tubes are arranged at the tube elements in order to extract the pressure difference generated by the flow resistor, wherein a first extension tube opens into the first tube element and a further extension tube opens into the second tube element. The first extension tube is arranged at the first tube element and the further extension tube is arranged at the second tube element.

A drawback with this solution is that the extension tubes project essentially radially from the flow sensor, so that when in use the measuring tubes arranged there also project essentially radially, as a result of which the flow sensor occupies a relatively large space when in use and therefore causes complicated handling of the flow sensor for the user when in use.

A respiratory flow sensor is known from U.S. Pat. No. 6,585,662 B1, which from the structural design standpoint is almost identical to a respiratory flow sensor according to CH 701 755 B1, but has a substantially more practical design in use than the latter.

The problem of the present invention, therefore, is to create a respiratory flow sensor, which does not have at least some of the aforementioned drawbacks, has a compact design and can be produced easily and with high quality.

The problem is solved by the features of the independent claims. Advantageous developments are represented in the figures and in the dependent claims.

According to the invention, a respiratory flow sensor comprises a sensor tube, which has a longitudinal axis, a first flow tube portion and a second flow tube portion, a flow resistor which is arranged in the flow tube between the first flow tube portion and the second flow tube portion, and ports for extracting the pressure difference generated by the flow resistor, wherein a first port opens into the first flow tube portion via a first connecting line and a further port opens into the second flow tube portion via a second connecting line, wherein the ports each have a connecting line portion of the connecting line that runs essentially parallel to the longitudinal axis of the flow tube, and the openings of the ports are aligned in the same direction. The first port is arranged at the first flow tube portion and the further port is arranged at the second flow tube portion.

The term "essentially parallel to the longitudinal axis of the flow tube" is understood in this connection to mean on the one hand a mathematically defined parallel alignment with this longitudinal axis, but also an alignment diverging therefrom by a few degrees.

The two ports of the respiratory flow sensor are themselves advantageously aligned essentially parallel to one another, so that the respiratory flow sensor can be designed slim.

Each of the ports for extracting the pressure difference generated by the flow resistor is arranged at the respective flow tube portion, into the interior of which the corresponding connecting line leads. When the flow tube portions are united, therefore, care only needs to be taken with the sealing of the flow channel in the flow tube, so that the individual parts of the respiratory flow sensor are designed in a structurally more straightforward manner and can easily be united. Additional air guides into the connecting lines can be avoided, so that the measurement accuracy is ensured and even improved compared to the previously known respiratory flow sensors.

The connecting lines are advantageously constituted free from butt joints. In other words, butt joints are advantageously not present in each connecting line from the openings of the ports up to the entry into the respective flow portion. Effects having an unfavourable influence on the measurement can thus be prevented and precise measurement accuracy is also improved.

The ports for extracting the pressure difference generated by the flow resistor can be arranged, whilst ensuring the connection of connecting tubes, close to a housing outer side of the respiratory flow sensor, which enables a very compact design of the entire respiratory flow sensor.

The respiratory flow sensor preferably comprises two housing parts, i.e. the first flow tube portion and the second flow tube portion, which enables a straightforward assembly of the respiratory flow sensor.

The respiratory flow sensor also preferably consists of injection moulded parts or is itself an injection moulded part. Injection moulded parts, especially in the case of larger batch quantities, can be produced particularly economically and, where required, are easy to assemble.

The respiratory flow sensor is preferably also produced from a plastic suitable for medical applications, so that for example there is no need for additional coatings in the flow tube.

The connecting lines preferably each comprise a further connecting line portion, which runs straight at least in sections and encloses an angle with the connecting line portion running essentially parallel to the longitudinal axis of the flow tube, which enables a structurally straightforward design of the connecting line.

The further connecting line portion of this connecting line running straight at least in sections encloses an angle of 40° to 70° with the connecting line portion of this connecting line running essentially parallel to the longitudinal axis of the flow tube, so that straightforward production of the respiratory flow sensor, in particular as an injection moulded part, is provided whilst ensuring a good air guide.

The first flow tube portion preferably comprises an essentially cylindrical portion and a radially widening portion, wherein the radially widening portion becomes larger towards an open end of the first flow tube portion. The second flow tube portion can thus easily be arranged at the first flow tube portion.

Alternatively or in addition, the second flow tube portion comprises an essentially cylindrical portion and a radially widening portion, wherein the radially widening portion becomes larger towards an open end of the second flow tube portion. The first flow tube portion can thus easily be arranged at the second flow tube portion and the two flow tube portions can be arranged against one another in a sealing manner.

In particular, a radially projecting flange with a contact face is provided in each case at the open end of the first flow tube portion and of the second flow tube portion, so that the diameter in this region is greater and the arrangement with the aid of the two contact faces of the two flow tube portions is thus made easier.

A first port recess for receiving the further port of the second flow tube portion at least in sections is preferably present at the radially widening portion of the first flow tube portion. The further port of the second flow tube portion can thus easily be arranged in this first port recess, so that the size of the respiratory flow sensor can be reduced and a respiratory flow sensor as compact as possible is made available.

In particular, the first port recess is arranged at the radially projecting flange of the first flow tube portion. The first flow tube portion has an improved stability in the region of the radially projecting flange, so that the first port recess can also have an improved stability and strength.

The first support structure for supporting the further port of the second flow tube portion is advantageously provided at the radially widening portion of the first flow tube portion, so that an enlarged contact face is provided for this further port and therefore the latter is received in a mechanically more stable manner and for example cannot kink.

The further port of the second flow tube portion advantageously comprises a support portion, with which this port can advantageously lie adjacent to the first port recess at the radially widening portion of the first flow tube portion. The further port is thus held in a stable manner in this port recess. Kinking of the further port due to external mechanical loads, for example, can thus be further prevented.

Alternatively or in addition, a further port for receiving the first port of the first flow tube portion at least in sections is present at the radially widening portion of the second flow tube portion. The first port of the first flow tube portion can thus easily be arranged in this second port recess, so that the size of the respiratory flow sensor can be further reduced and a respiratory flow sensor as compact as possible is provided.

In particular, the second port recess is arranged at the radially projecting flange of the second flow tube portion. The second flow tube portion has an improved stability in the region of the radially projecting flange, so that the second port recess can also have an improved stability or strength.

A further support structure for supporting the first port of the first flow tube portion is advantageously provided at the radially widening portion of the second flow tube portion, so that this port has improved mechanical stability and for example cannot kink.

The first port of the first flow tube portion advantageously comprises a support portion, with which this port can advantageously lie adjacent to the second port recess at the radially widening portion of the second flow tube portion. The first port is thus held in a stable manner in this port recess. Kinking of the first port due to external mechanical loads, for example, can thus also be prevented.

The further connecting line portion of the one connecting line that runs straight at least in sections advantageously encloses an angle of 48° to 62° with the connecting line portion of this connecting line that runs essentially parallel to the longitudinal axis of the flow tube, so that, in addition to the straightforward production of the respiratory flow sensor, in particular as an injection moulded part, and the guaranteeing of a good air guide, the post-processing outlay, e.g. when the respiratory flow sensor is removed from the mould, is small.

The further connecting line portion of this connecting line that runs straight at least in sections particularly preferably encloses an angle of 52° to 58° with the connecting line portion of this connecting line that runs essentially parallel to the longitudinal axis of the flow tube, so that the respiratory flow sensor, apart of the previously mentioned advantages, can be designed in the optimum manner with regard to stability and material requirement for production thereof.

The further connecting line portion of the other connecting line that runs straight at least in sections advantageously encloses an angle of 130° to 160° with the connecting line portion of the other connecting line that runs essentially parallel to the longitudinal axis of the flow tube, so that straightforward production of the respiratory flow sensor, in particular as an injection moulded part, is provided whilst guaranteeing a good air guide.

The further connecting line portion of the other connecting line that runs straight at least in sections preferably encloses an angle of 138° to 152° with the connecting line portion of the other connecting line that runs essentially parallel to the longitudinal axis of the flow tube, so that in addition to the straightforward production of the respiratory flow sensor, in particular as an injection moulded part, and the guaranteeing of a good air guide, the post-processing outlay, e.g. when the respiratory flow sensor is removed from the mould, is small.

The further connecting line portion of the other connecting line that runs straight at least in sections particularly preferably encloses an angle of 142° to 148° with the connecting line portion of the other connecting line that runs essentially parallel to the longitudinal axis of the flow tube, so that the respiratory flow sensor, apart from the previously mentioned advantages, can be designed in the optimum manner with regard to stability and material requirement for production thereof.

The first port is preferably arranged adjacent to the further port. The two ports are thus arranged in the same region of the flow tube, as a result of which kinking of the connecting tubes is prevented.

The first port is preferably arranged adjacent to and spaced apart from the further port, so that the connecting tubes can easily be connected to the respective ports.

The first port is advantageously arranged at least in sections at the outer lateral surface of the first flow tube portion and therefore at a housing outer side of the respiratory flow sensor. The respiratory flow sensor can thus easily be produced and an absolutely tight connection between the first port and the first flow tube portion can be guaranteed. There is no need for an additional groove/comb structure in the region of the further connecting line portion.

Alternatively or in addition, the further port is arranged at least in sections at the lateral surface of the second flow tube portion and therefore at the housing outer wall of the respiratory flow sensor. An absolutely tight connection between the second port and the second flow tube portion can thus be guaranteed. There is no need for an additional groove/comb structure in the region of the further connecting line portion. The two flow tube portions can thus be united using simple process steps, wherein the flow resistor can be positioned exactly in the flow tube and the need for the absolutely tight connection between the two flow tube portions is guaranteed.

A tool opening is preferably provided for removing the moulding tool for the moulding of the further connecting line portion of a connecting line and in each case a closure element for closing this tool opening, wherein the first closure element for closing the further connecting line portion of the first connecting line is preferably arranged at the first flow tube portion and wherein the second closure element for closing the further connecting line portion of the first connecting line is preferably arranged at the second flow tube portion, as a result of which the respiratory flow sensor can be produced in a straightforward manner. With the closure of the tool opening, the air guide in the corresponding connecting line is secured with no air short-circuit.

The first closure element is preferably arranged at the first flow tube portion in a swivellable manner by means of a hinge, preferably by means of a living hinge. The second closure element is preferably also arranged at the second flow tube portion in a swivellable manner by means of a hinge, preferably by means of a living hinge. The closure elements are thus arranged in a captive manner on the respective component. The closure elements are thus available during the entire assembly of the respiratory flow sensor and if need be can be respectively optimised for the closure of the tool opening in the production process of the respiratory flow sensor.

The closure elements are advantageously made of a material suitable for medical applications, in particular made of a plastic suitable for medical applications. If the corresponding flow tube portion is produced from the same material or a material compatible with connection techniques, the tool openings can thus be closed with a single work step.

The first and/or the second closure element can be constituted as plugs, which enable closing of the corresponding tool opening with a simple process step.

Groove/comb structures are preferably provided at the tool openings and/or the closure elements, so that the latter engage into one another when they are united and thus guarantee a high degree of tightness of the closure.

The closure elements are preferably fixed at the respective flow tube portion for the closure of the tool openings by means of a connection that connects in a sealing manner, particularly preferably by means of ultrasonic welding, so that an absolute tightness of the closure is guaranteed.

In an alternative embodiment, the closure elements for closing the tool openings are fixed at the respective flow tube portion by types of welding other than ultrasonic welding, by means of a snug fit or by means of adhesion.

In a further alternative embodiment, a 2-component solution for example is provided in the production of the respiratory flow sensor, wherein at least one thereof is made of a softer plastic or a plastic with adhesive properties or is coated, for example in the region of the contact faces. When the corresponding parts are united, the latter are directly connected to one another in a sealing manner.

In the production of the respiratory flow sensor, such a 2-component solution is suitable for those parts which are to be connected to one another and in particular which are to be connected to one another in a sealing manner.

The respiration adapter according to the invention comprises at least one respiratory flow sensor, which comprises at least one of the aforementioned features, and at least one connecting tube, which connects one of the ports of the respiratory flow sensor to a measuring device, in order to create a fluidic connection from the measuring device to the respiratory flow sensor, wherein the fluidic connection is constituted, free from butt joints, directly in one of the flow tube portions of the respiratory flow sensor.

Advantageously, the measuring device for measuring the pressure difference is constituted in the respiratory flow sensor.

This respiration adapter is straightforward in application and also has the advantages mentioned here in connection with the respiratory flow sensor.

The term "fluidic connection" is understood in this connection to mean an optimally tight connection from an entry point to an exit point, through which a fluid, such as air for example, can flow.

Advantageously, a connecting tube which can be connected to the measuring device is provided in each case at all the ports of the respiratory flow sensor. In order to simplify the use of the respiration adapter for the user, the connecting tubes can be constituted optically, e.g. by colour, and/or hepatically different.

At least one breathing tube and a mouthpiece, which is fed to the patient, is preferably provided in the respiration adapter, wherein the at least one breathing tube connects the mouthpiece to the at least one respiratory flow sensor, so that a respiration adapter can be created that is straightforward to use.

A further breathing tube is also advantageously provided, which is also connected to the at least one respiratory sensor and can be connected to a respiratory device or an intensive care device, so that the user has a respiration adapter that is easy to use and available.

The method according to the invention for the production of a respiratory flow sensor is characterised by the steps:

Formation of the first flow tube portion and the second flow tube portion each in a production tool mould, wherein the connecting line portions and the further connecting line portions of the corresponding connecting lines are formed as a moulding tool by sliders and/or as a moulding tool by means of pins (step a)).

Alternatively or in addition, the further connecting line portions of the corresponding connecting lines are formed as a moulding tool by means of pins (step a)).

The moulding tool or the moulding tools are arranged in the respective production tool mould or can be arranged in the latter, which enables straightforward production of the first flow tube portion as well as the second flow tube portion.

Removal of the first flow tube portion and the second flow tube portion from the respective production tool mould (step b)).

The forming tools constituted as a slider or pins decisively simplify the removal of the first flow tube portion and also the second flow tube portion from the respective production tool mould.

Alignment of the first flow tube portion and the second flow tube portion with one another, and more precisely axially and with respect to the angular position to one another (step c)), so that the correct alignment of these parts with one another and therefore the proper functioning of the respiratory flow sensor is ensured.

Sealing connection of the first flow tube portion and the second flow tube portion (step d)). The connection connecting in a sealing manner comprises—as a non-comprehensive list—weld joints, in particular ultrasonic weld joints, snug fits, adhesive joints or 2-component solutions.

A sealing closure of a tool opening at the respective ports of the respiratory flow sensor advantageously takes place with the aid of ultrasonic welding. The air guide in the corresponding connecting line is ensured with the closing of the tool opening, with no air short-circuit.

Further advantages, features and details of the invention emerge from the following description, in which examples of embodiment of the invention are described by reference to the drawings.

The list of reference numbers, as also the technical content of the claims and figures, is a component of the disclosure. The figures are described in a comprehensive and interrelated manner. Identical reference numbers denote corresponding components, reference numbers with different indices indicate similar components or components with the same function.

The first embodiment of a respiratory flow sensor 11 shown in FIGS. 1 to 8 is an injection moulded part in the present example and respiratory flow sensor 11 is produced from plastic.

Figure 1:
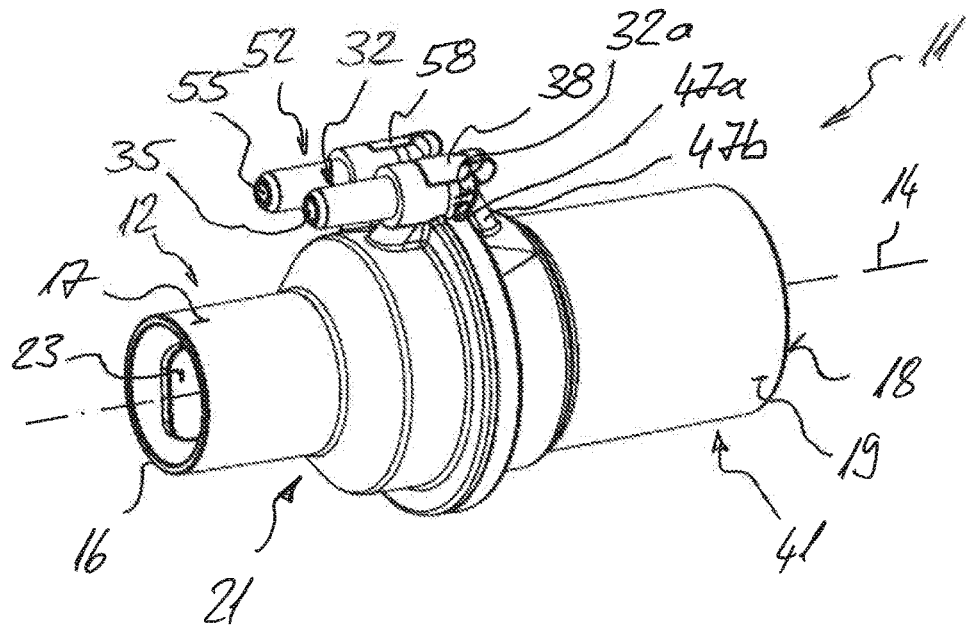
FIG. 1 shows a first embodiment of a respiratory flow sensor according to the invention in a perspective representation.
Figure 2:
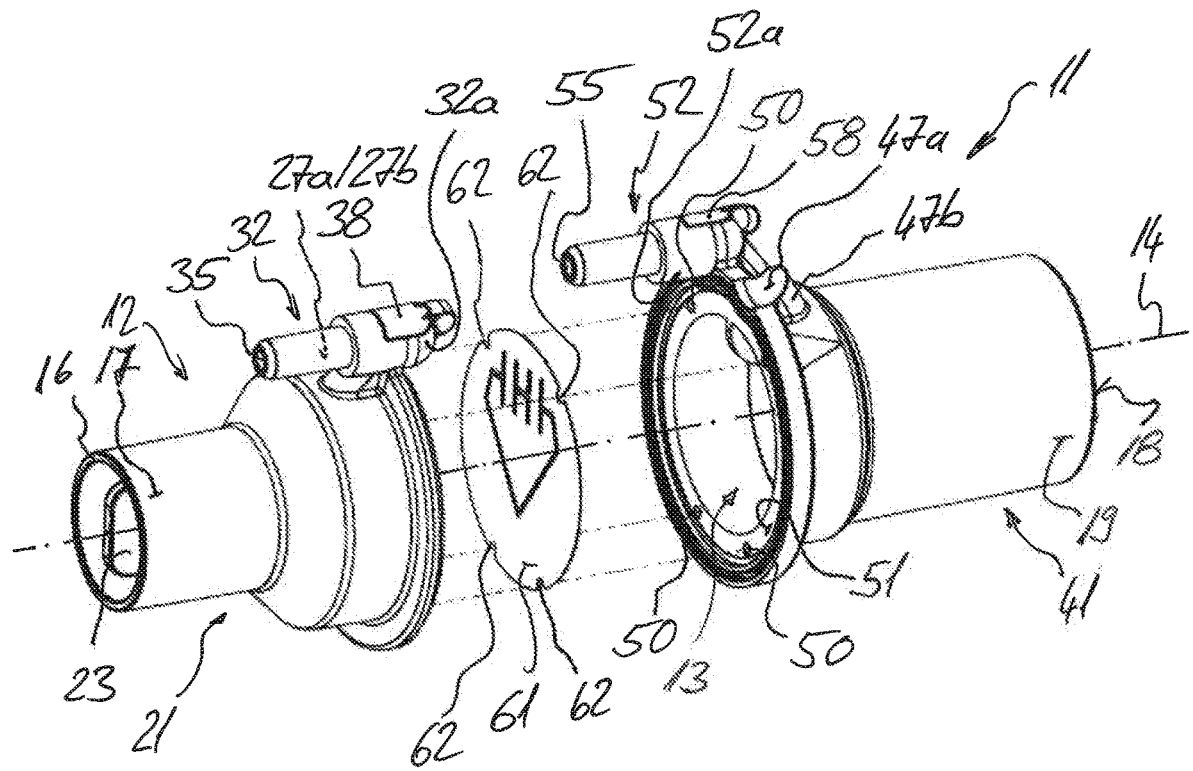
FIG. 2 shows the respiratory flow sensor according to FIG. 1 in a perspective exploded representation.
Figure 3:
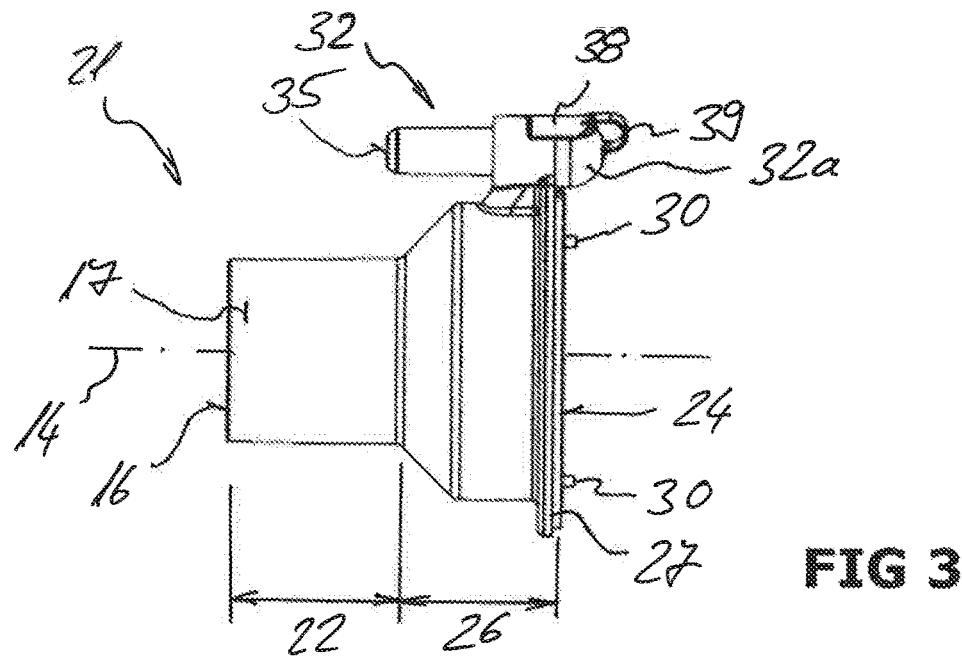
FIG. 3 shows a first flow tube portion of the respiratory flow sensor according to FIG. 1 in a side view.
Figure 4:
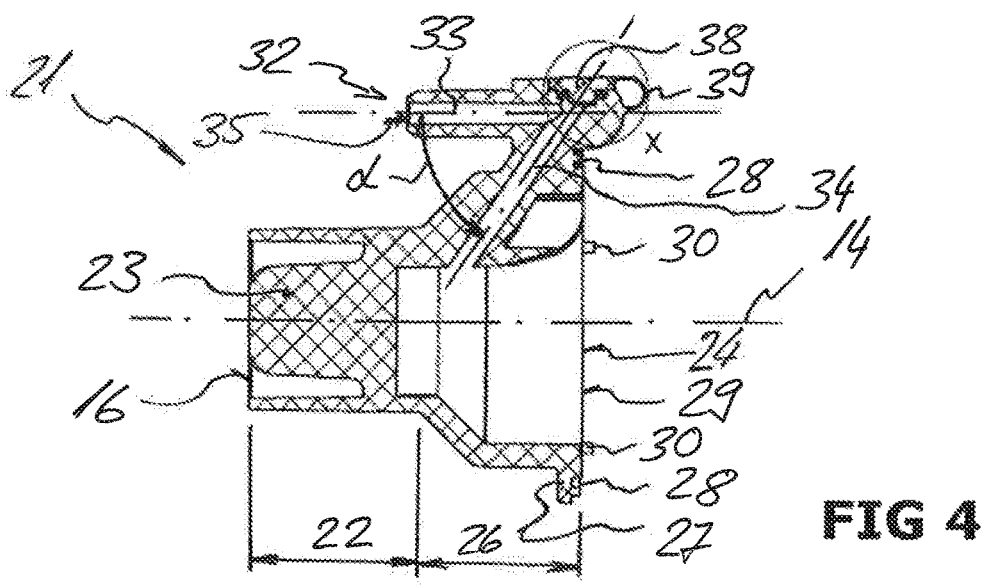
FIG. 4 shows the first flow tube portion according to FIG. 3 in a longitudinal cross-section.

As can be seen from FIGS. 1 and 2, respiratory flow sensor 11 comprises a flow tube 12, which has a longitudinal axis 14, a first flow tube portion 21 and a second flow tube portion 41, as well as a tube port 17 and respectively 19 for breathing tubes in each case in the region of the two free ends 16 and 18.

A breathing tube is arranged at tube port 17, which leads to a mouthpiece or breathing mask (not represented here), which is placed on the patient for breathing. The breathing tube, which leads to a respiratory device, is arranged at the other tube port 19.

In flow tube 12 which constitutes a flow channel 13, a flow resistor 61, which is constituted as an aperture flap, is arranged between first flow tube portion 21 and second flow tube portion 41. Recesses 62 are provided around the circumference on flow resistor 61, which recesses cooperate with cams 30 arranged at first flow tube portion 21 and thus ensure the correct alignment of flow resistor 61 in flow channel 13 during the assembly of respiratory flow sensor 11.

Instead of projecting cams 30 and recesses 62 cooperating therewith, the correct alignment of flow resistor 61 in flow channel 13, but also the correct alignment of first flow tube portion 21 and second flow tube portion 41 can be ensured by adjustment means, which can also be arranged for example on the outside, and/or by means of a groove/comb structure.

Respiratory flow sensor 11 comprises two ports 32 and 52 for extracting the pressure difference generated by flow resistor 61. The openings 35 and respectively 55 of ports 32 and 52 are aligned in the same direction, i.e. in the direction of free end 16 of first flow tube portion 21. Ports 32 and 52 are arranged adjacent to and spaced apart from one another at the outer lateral surfaces of respective flow tube portions 21 and 41.

First flow tube portion 21 (see in particular also FIGS. 3 to 5) is a first housing part of respiratory flow sensor 11. First flow tube portion 21 has an essentially cylindrical portion 22 and a radially widening portion 26, so that the diameter is larger in this region. Provided in essentially cylindrical portion 22 in its flow channel portion is a guide element 23, which divides flow channel 13 in this region into two portions identical in size and enables a targeted air guide in flow tube 12.

In radially widening portion 26, the corresponding flow channel portion also becomes larger towards open end 24 of first flow tube portion 21. A radially projecting flange 27 with a contact face 29 is provided at this open end 24, so that the diameter is larger in this region. Contact face 29 is facing second flow tube portion 41 in the assembled state of respiratory flow sensor 11. At this flange 27, a first circumferential part 28 of a groove/comb structure is provided on contact face 29. A first port recess 27a is present at radially widening portion 26 in the region of flange 27, said port recess being supported by a first support structure 27b. Further port 52 of second flow tube portion 41 comprises, adjacent to opening 55, a support portion 52a, which in the assembly state abuts or rests in a first port recess 27a of respiratory flow sensor 11 and is supported by first support structure 27b.

Cams 30 for the correct alignment of flow resistor 61 in flow tube 12 project from contact face 29 during the assembly of respiratory flow sensor 11.

First port 32 for extracting the pressure difference generated by flow resistor 61 opens into the flow channel portion of first flow tube portion 21 via a first connecting line. The first connecting line comprises a connecting line portion 33, which runs essentially parallel to longitudinal axis 14 of flow tube 12, as well as a further connecting line portion 34, which runs straight in sections and encloses an angle α of 40° to 70°, preferably of 48° to 62° and particularly preferably of 52° to 58°, with connecting line portion 33 that runs essentially parallel to longitudinal axis 14 of flow tube 12. In the present example, this angle α amounts to 55°.

A first tool opening 36 for removing the moulding tool for moulding further connecting line portion 34 and a first closure element 38 for closing this tool opening 36 is provided at first flow tube portion 21 in an extension of further connecting line portion 34 of the first connecting line. First closure element 38 is arranged swivellable at first flow tube portion 21 by means of a hinge, here by means of a living hinge 39 or a film hinge.

A groove structure 34 is formed around first tool opening 36. A comb structure 40 is formed at first closure element 38, which engages in groove structure 37 when first tool opening 36 is closed and, in the case of a welding procedure, in particular in the case of an ultrasonic welding procedure, ensures a tight closure of first tool opening 36 and therefore the tightness of the first connecting line.

Figure 5:
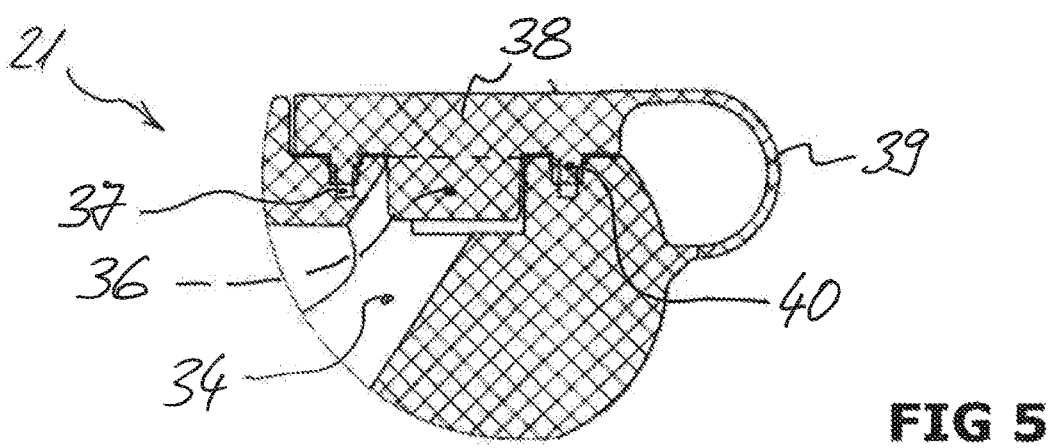
FIG. 5 shows a detail view X of FIG. 4.
Figure 6:
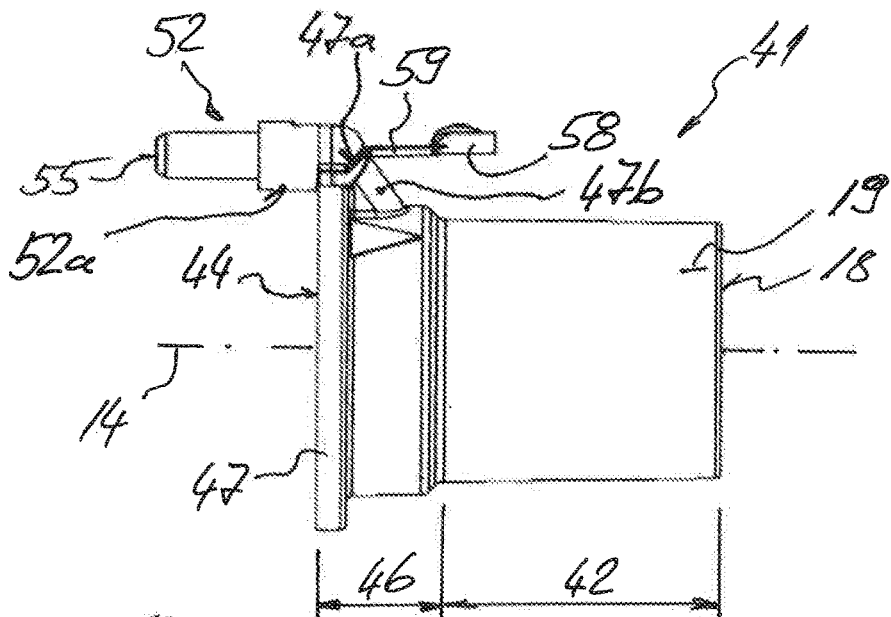
FIG. 6 shows a second flow tube portion of the respiratory flow sensor according to FIG. 1 in a side view.
Figure 7:
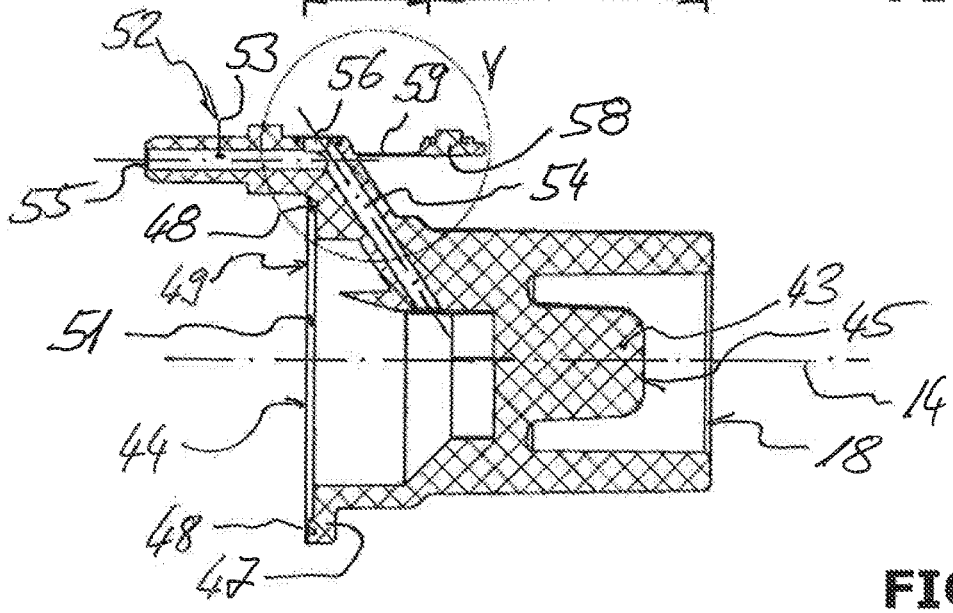
FIG. 7 shows the second flow tube portion according FIG. 6 in a longitudinal cross-section.

First tool opening 36 is shown in the closed state in the representation according to FIG. 5.

Second flow tube portion 41 (see also in particular FIGS. 6 to 8) is a second housing part of respiratory flow sensor 11. Second flow tube portion 41 comprises an essentially cylindrical portion 42, which tapers at the outside in the direction of free end 18, and has a radially enlarged portion 46. Provided in essentially cylindrical portion 42, in its flow channel portion, is a guide element 43, which divides flow tube 12 in this region into two portions of identical size and enables a targeted air guide in flow tube 12. Free end 45 of guide element 43 is set back with regard to free end 18 of flow tube 12.

In the radially, i.e. outwardly, enlarged portion 46, the corresponding flow channel portion is also enlarged towards open end 44 of second flow tube portion 41. Provided at this free end 44 is a radially projecting flange 47 with a contact face 49, which in the united state of respiratory flow sensor 11 is facing first flow tube portion 21 or its contact face 29. At this flange 47, a second circumferential part 48 of a groove/comb structure is provided on contact face 49, which groove/comb structure engages in first circumferential part 28 of the groove/comb structure and, in the case of welding, in particular in the case of ultrasonic welding, welds with the latter. A tight connection of first flow tube portion 21 with second flow tube portion 41 is thus guaranteed in a straightforward manner. A complex, multiple structure for the groove/comb structure or pressure surfaces, such as is proposed in CH 701 755 B1, is not required with the solution according to the invention.

A receiving recess 51 is provided at flange 17 offset with respect to contact face 49, in which flow resistor 61 is accommodated at least in sections. Arranged on the circular cylindrical ring of receiving recess 51 are holes 50, into which cams 30 of first flow tube portion 21 penetrate during assembly of respiratory flow sensor 11. This embodiment enables not only the correct alignment of flow resistor 61 in flow channel 13 during assembly of respiratory flow sensor 11, but in combination with groove/comb structures 28 and respectively 48 at flanges 27 and 47 also the arrangement of flow resistors of different thickness, according to the area of application or the requirement. Respiratory flow sensor 11 can thus be used flexibly and can be adapted without a large outlay to other types of flow resistors 61. Flow resistor 61 used is held, in particular clamped or otherwise held, such as by gluing in sections or completely, between first flow tube portion 21 and second flow tube portion 41.

In the assembled state of respiratory flow sensor 11, no flange pressure surfaces are formed at flanges 27 and 47. The connection between first flow tube portion 21 as a first housing part of respiratory flow sensor 11 and second flow tube portion 41 as a second housing part of respiratory flow sensor 11 takes place solely by the simply designed groove/comb structures 28 and respectively 48 at flanges 27 and 47.

A further port recess 47a is present at a radially widening portion 46 in the region of flange 47, said port recess being supported by a further support structure 47b. First port 32 of first flow tube portion 21 comprises, adjacent to closure element 38, a support portion 32a, which in the united state abuts or rests in further port recess 47a of respiratory flow sensor 11 and is supported by support structure 47b.

Second port 52 for extracting the pressure difference generated by flow resistor 61 opens into the flow channel portion of second flow tube portion 41 via a second connecting line. The second connecting line comprises a connecting line portion 53, which runs essentially parallel to longitudinal axis 14 of flow channel 13, as well as a further connecting line portion 54, which runs straight in sections and encloses an angle β of 130° to 160°, preferably of 138° to 152° and particularly preferably of 142° to 148°. This angle β amounts to 145° in the present example.

A second tool opening 56 for removing the moulding tool for moulding further connecting line portion 54 and a second closure element 58 for closing this tool opening 56 is provided at second flow tube portion 41 in an extension of further connecting line portion 54 of the second connecting line. Second closure element 58 is arranged swivellable at second flow tube portion 41 by means of a hinge, here by means of a living hinge 59 or a film hinge.

A groove structure 57 is formed around second tool opening 56. A comb structure 60 is formed at second closure element 58, which engages in groove structure 57 when first tool opening 36 is closed and, in the case of a welding procedure, in particular in the case of an ultrasonic welding procedure, ensures a tight closure of first tool opening 56 and therefore the tightness of the second connecting line.

Figure 8:
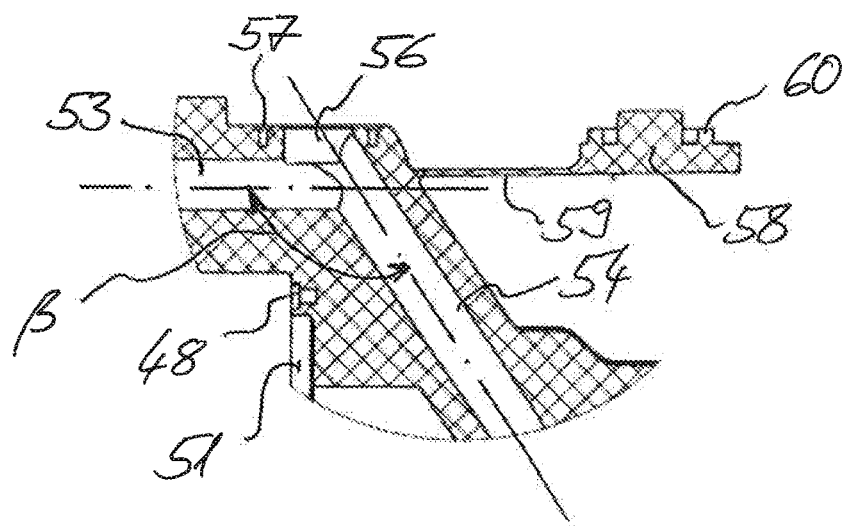
FIG. 8 shows a detail view Y of FIG. 7.

Second tool opening 56 is shown in the open state in the representation according to FIG. 8.

For the production of respiratory flow sensor 11, first flow tube portion 21 is moulded in a production tool mould, wherein connecting line portion 33 is formed as a moulding tool by means of a pin and further connecting line portion 34 is formed as a moulding tool by means of a slider. First flow tube portion 21 is then removed from production tool mould, wherein the slider is previously withdrawn from first flow tube portion 21 for this purpose.

Second flow tube portion 41 is moulded simultaneously or offset in time in a further production tool mould, wherein connecting line portion 53 is formed as a moulding tool by means of a pin and further connecting line portion 54 is formed as a moulding tool by means of a slider. Second flow tube portion 41 is then removed from the production tool mould, wherein the slider is previously withdrawn from second flow tube portion 41 for this purpose.

Tool openings 36 and respectively 56 can already be closed with closure element 38 and 58.

First flow tube portion 21 and second flow tube portion 41 are now aligned with one another, and more precisely axially and with respect to the angular position to one another.

First flow tube portion 21 and second flow tube portion 41 are then connected to one another in a sealing manner, in the present example of the embodiment by ultrasonic welding.

Figure 9:
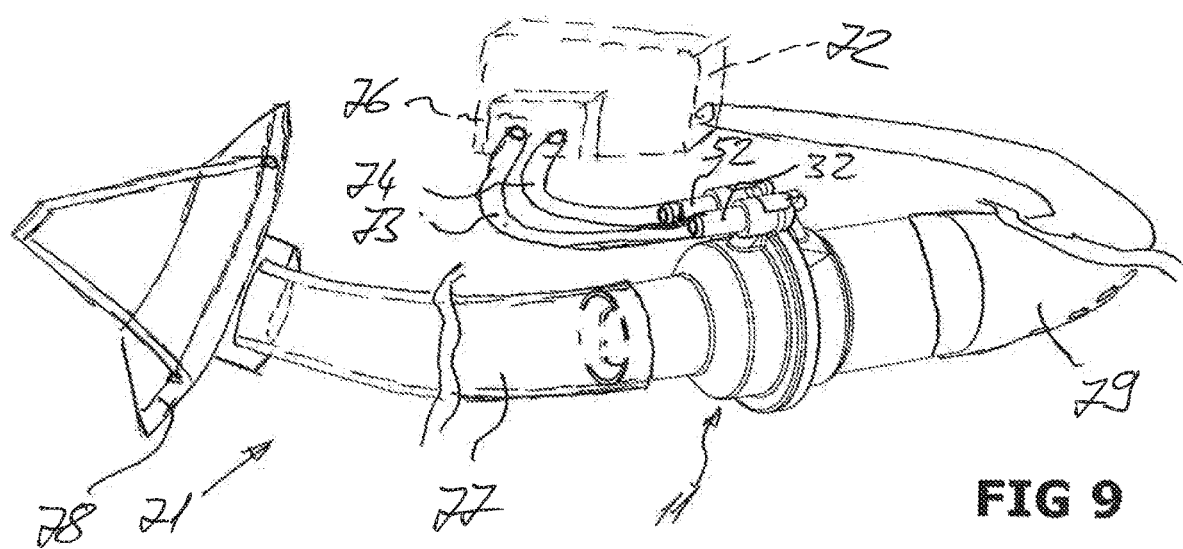
FIG. 9 shows a respiration adapter with a respiratory flow sensor according to FIGS. 1 to 8 in a perspective representation.
Figure 10:
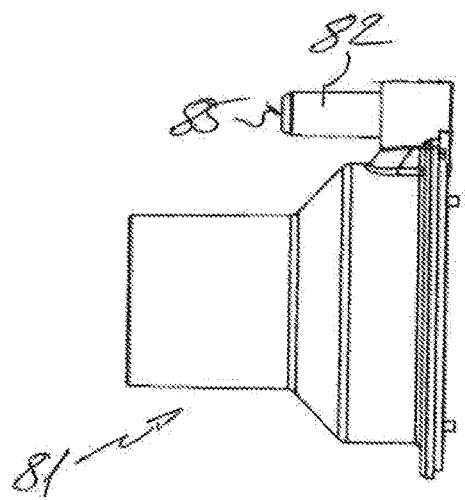
FIG. 10 shows a first flow tube portion of a respiratory flow sensor according to a second embodiment in a side view.
Figure 11:
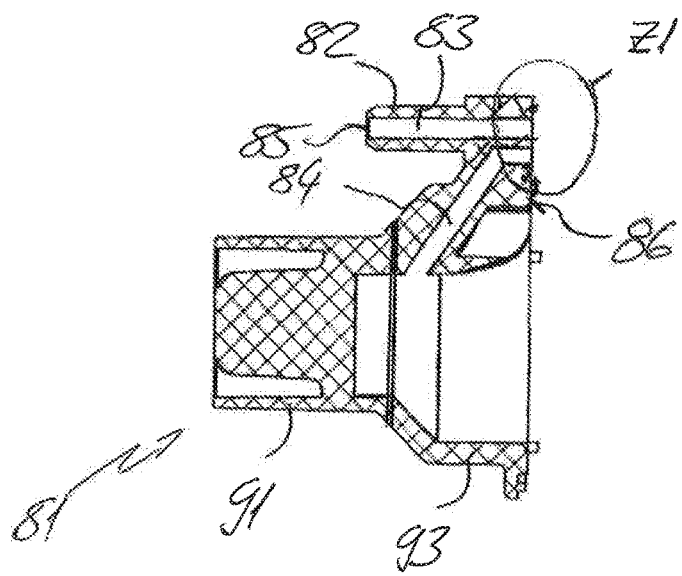
FIG. 11 shows the first flow tube portion according to FIG. 10 in a longitudinal cross-section.
Figure 12:
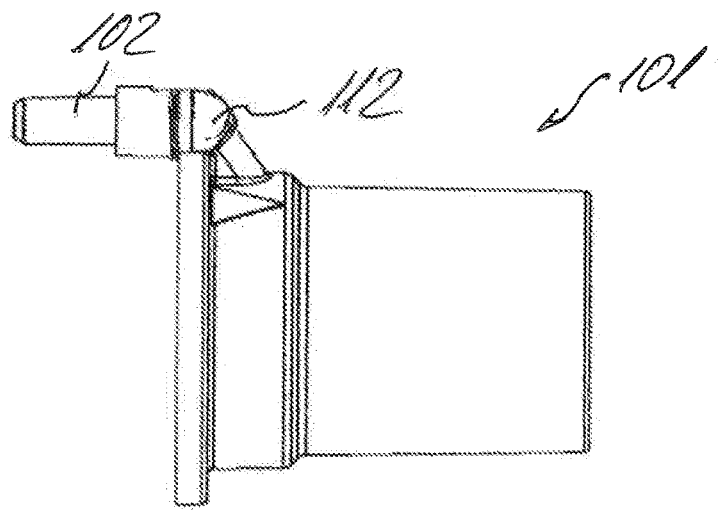
FIG. 12 shows a second flow tube portion of the respiratory flow sensor according to the second embodiment in a side view.
Figure 13:
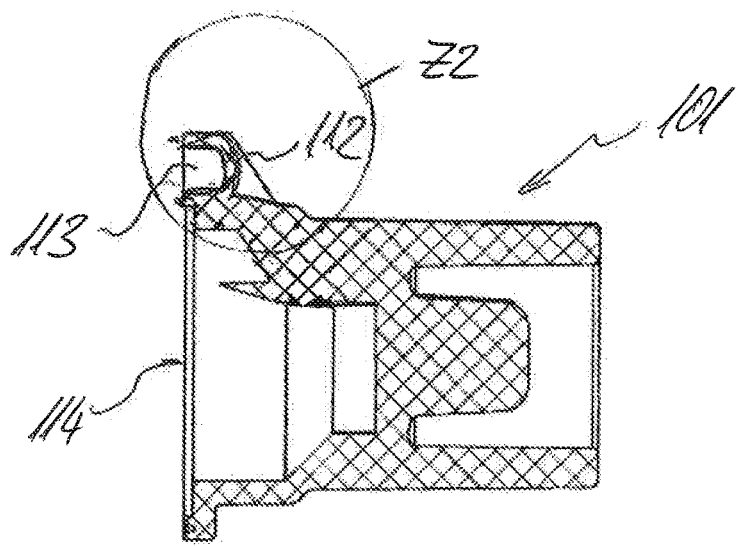
FIG. 13 shows the second flow tube portion according to FIG. 12 in a longitudinal cross-section.

Respiration adapter 71 shown in FIG. 9 comprises a respiratory flow sensor 11, a connecting tube 73, which connects port 32 of respiratory flow sensor 11 to a measuring device 76, in order to create a first fluidic connection of measuring device 76 to the respiratory flow sensor 11, a connecting tube 74, which connects port 52 of respiratory flow sensor 11 to a measuring device 76, in order to create a second fluidic connection of measuring device 76 to respiratory flow sensor 11. The fluidic connections are constituted free from butt joints opening directly into one of the flow tube portions of respiratory flow sensor 11.

Furthermore, respiration adapter 71 comprises a first breathing tube 77 and a mouthpiece 78, which is constituted as a breathing mask. First breathing tube 77 connects mouthpiece 78 to respiratory flow sensor 11. In addition, respiration adapter 71 comprises a second breathing tube 79, which connects respiratory flow sensor 11 to a respiratory device 72.

Measuring device 76 is designed for the measurement or detection and processing of the pressure difference generated in respiratory flow sensor 11. In the present example, measuring device 76 is integrated into respiratory device 72, which is designed for the artificial respiration of a patient.

In the second example of embodiment of a respiratory flow sensor represented in FIGS. 10 to 14, first flow tube portion 81 (see in particular FIGS. 10 and 11) differs from first flow tube portion 21 of respiratory flow sensor 11 essentially only in that the latter is constituted multi-part and comprises a connecting line, wherein connecting line portion 83 proceeding from opening 85 of port 82 is not in a direct connection with further connecting line portion 84. Connecting line portion 83 and also further connecting line portion 84 each open into open end 86 of first flow tube portion 81. Furthermore, port 82 is arranged at that of first flow tube portion 81.

First flow tube portion 81 is constituted in two parts, i.e. flow tube portion part 91 and flow tube portion part 93, which are connected to one another by means of a connection connecting in a sealing manner. As a result of the two-part embodiment of first flow tube portion 81, the structure of the connecting line in the latter can be constituted in the desired manner whilst guaranteeing straightforward production. A production tool opening or a tool opening is not therefore required for the moulding of first flow tube portion 81.

Second flow tube portion 101 of the second embodiment of a respiratory flow sensor (see in particular FIGS. 12 and 13) essentially corresponds in design to second flow tube portion 41 of respiratory flow sensor 11. This second flow tube portion 101, however, comprises, in the region which in the jointed state lies opposite port 82 of first flow tube portion 81, an air diversion 112, hollow space 113 whereof is open towards free end 114 of second flow tube portion 101.

Figure 14:
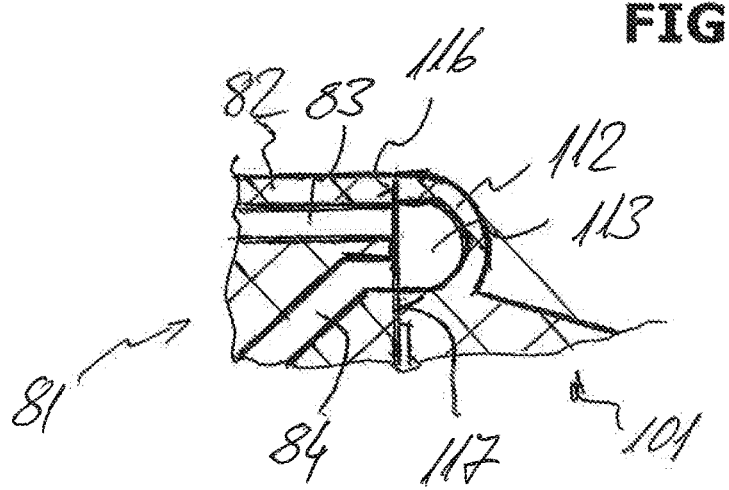
FIG. 14 shows a detail view Z of FIGS. 11 and 13.

In the jointed state of first flow tube portion 81 and second flow tube portion 101, as is represented in detail in FIG. 14, the course of the first connecting line from port 82 into the interior of first flow tube portion 81 can be seen. The fluid is diverted in hollow space 113. The sealing connection between first flow tube portion 81 and second flow tube portion 101 in the region of this diversion is provided only in contact sections 116 and 117. In this embodiment, the first connecting line is not constituted free from butt joints. The second connecting line in second flow tube portion 101, however, continues to be free from butt joints.

Figure 15:
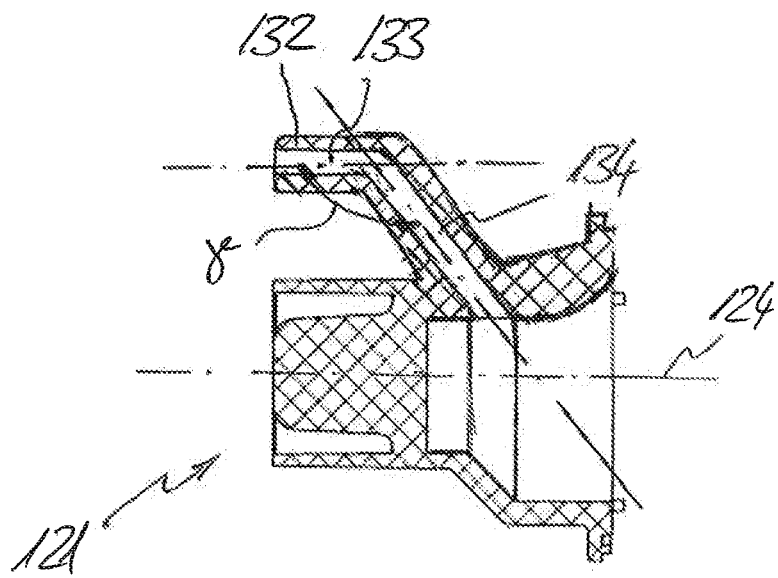
FIG. 15 shows the first flow tube portion of a respiratory flow sensor according to a third embodiment in a longitudinal cross-section.
Figure 16:
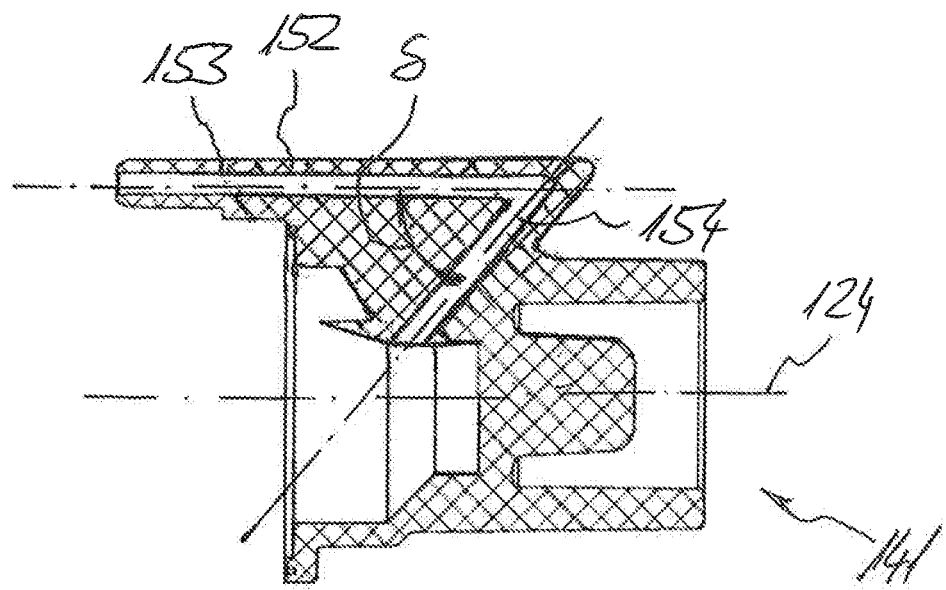
FIG. 16 shows the second flow tube portion of the respiratory flow sensor according to the third embodiment in a longitudinal cross-section.
Figure 17:
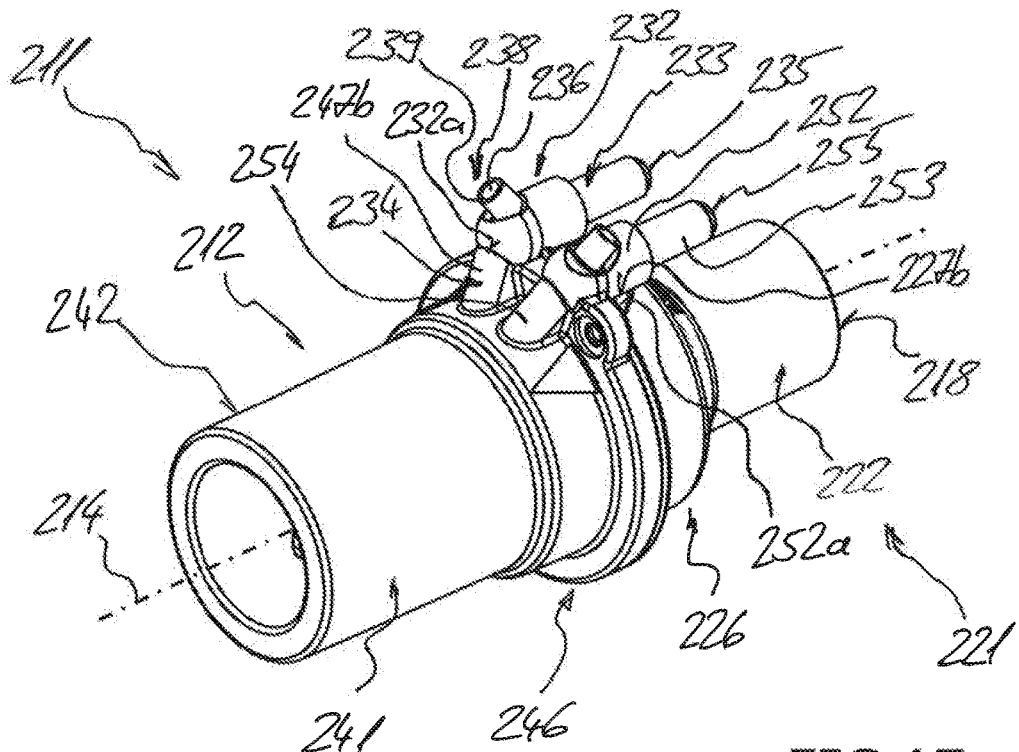
FIG. 17 shows a further embodiment of a respiratory flow sensor according to the invention in a perspective representation.

First flow tube portion 121 (see FIG. 15) and second flow tube portion 141 (see FIG. 16) of a respiratory flow sensor according to a third embodiment differ only in the embodiment of their connecting lines.

First port 132 for extracting the pressure difference generated by the flow resistor opens into the flow channel portion of first flow tube portion 121 via a first connecting line. Connecting line portion 133 running essentially parallel to longitudinal axis 124 of the flow tube and further connecting line portion 134 enclose an angle γ of 130° to 160°, preferably of 138° to 152° and particularly preferably of 142° to 148°. In the present example, this angle γ amounts to approximately 147°. This angle γ has been selected such that the moulding tool designed as a slider can simply be withdrawn when first flow tube portion 121 is removed from the mould, without a tool opening being required for this.

Second port 152 for extracting the differential pressure generated by the flow resistor opens into the flow channel portion of second flow tube portion 141 via a second connecting line. Connecting line portion 153 running essentially parallel to longitudinal axis 124 of the flow tube and further connecting line portion 154 enclose an angle δ of 40° to 70°, preferably of 48° to 62° and particularly preferably of 52° to 58°, with connecting line portion 153 that runs essentially parallel to longitudinal axis 124 of the flow tube. In the present example, this angle δ amounts to 53°. This angle δ has been selected such that the moulding tool constituted as a slider can simply be withdrawn when second flow tube portion 141 is removed from the mould, without a tool opening being required for this.

The first connecting line and the second connecting line are each constituted free from butt joints.

In the further example of embodiment of a respiratory flow sensor 211 represented in FIG. 17 to FIG. 20, flow tube 212 has a longitudinal axis 214, a first flow tube portion 221 and a second flow tube portion 241, wherein first flow tube portion 221 (see in particular FIG. 18) differs from first flow tube portion 21 of respiratory flow sensor 11 essentially only in that a first closure element 238 is constituted at port 232 as tube portion 239. First closure element 238 comprises a first tool opening 236, which opens into further connecting line portion 234, wherein connecting line portion 233 proceeding from opening 235 of port 232 is in direct connection with further connecting line portion 234. First port 232 continues to be arranged at that of first flow tube portion 221.

First flow tube portion 221 is a first housing part of respiratory flow sensor 211. First flow tube portion 221 comprises an essentially cylindrical portion 222 and a radially widening portion 226, so that the diameter is larger in this region. In essentially cylindrical portion 222, a guide element 223 is provided in its flow channel portion, which guide element divides flow channel 213 in this region into two portions of identical size and enables a targeted air guide in flow tube 212.

Figure 18:
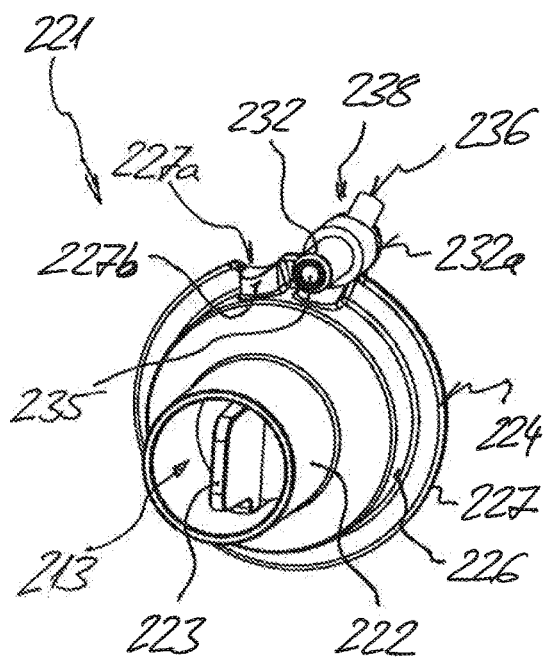
FIG. 18 shows the first flow tube portion according to FIG. 17 in a perspective representation.
Figure 19:
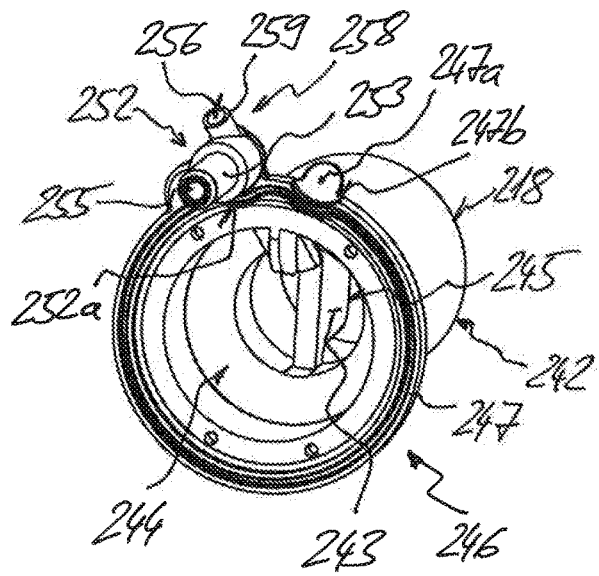
FIG. 19 shows the second flow tube portion according FIG. 17 in a perspective representation.

In radially widening portion 226 of first flow tube portion 221, the corresponding flow channel portion also becomes larger towards open end 224 of first flow tube portion 221 (see in particular FIG. 18). A radially projecting flange 227 is provided at this open end 224. At radially widening portion 226, in the region of flange 227, a first port recess 227a is present, which is supported by a first support structure 227b. Further port 252 of second flow tube portion 241 comprises adjacent to opening 255 a support portion 252a, which in the jointed state abuts or rests in first port recess 227a of respiratory flow sensor 11.

Second flow tube portion 241 of this example of embodiment of respiratory flow sensor 211 (see in particular FIG. 19) essentially corresponds in design to second flow tube portion 41 of respiratory flow sensor 11. This second flow tube portion 241, however, comprises a closure element 258 at second port 252, which is constituted as tube portion 259. Closure element 258 comprises a second tool opening 256, which opens into further connecting line portion 254, wherein connecting line portion 253 proceeding from opening 255 of second port 252 is in direct connection with further connecting line portion 254. Second port 252 continues to be arranged at that of second flow tube portion 241.

Second flow tube portion 241 continues to be a second housing part of respiratory flow sensor 211. Second flow tube portion 241 comprises an essentially cylindrical portion 242, which tapers at the outer side in the direction of free end 218. Second flow tube portion 241 comprises a portion 246 radially enlarged towards open end 224. In essentially cylindrical portion 242, a guide element 243 is provided in its flow channel portion, which guide element divides flow tube 212 in this region into two parts of identical size and enables a targeted air guide in flow tube 212. Free end 245 of guide element 243 is set back in respect of free end 218 of flow tube 212.

At radially widening portion 246 of second flow tube portion 241, in the region of flange 247, a further port recess 247a is present, which is supported by a further support structure 247b. First port 232 of first flow tube portion 221 comprises, adjacent to first closure element 238, a support portion 232a, which in the jointed state abuts or rests in further port recess 247a of respiratory flow sensor 11.

Figure 20:
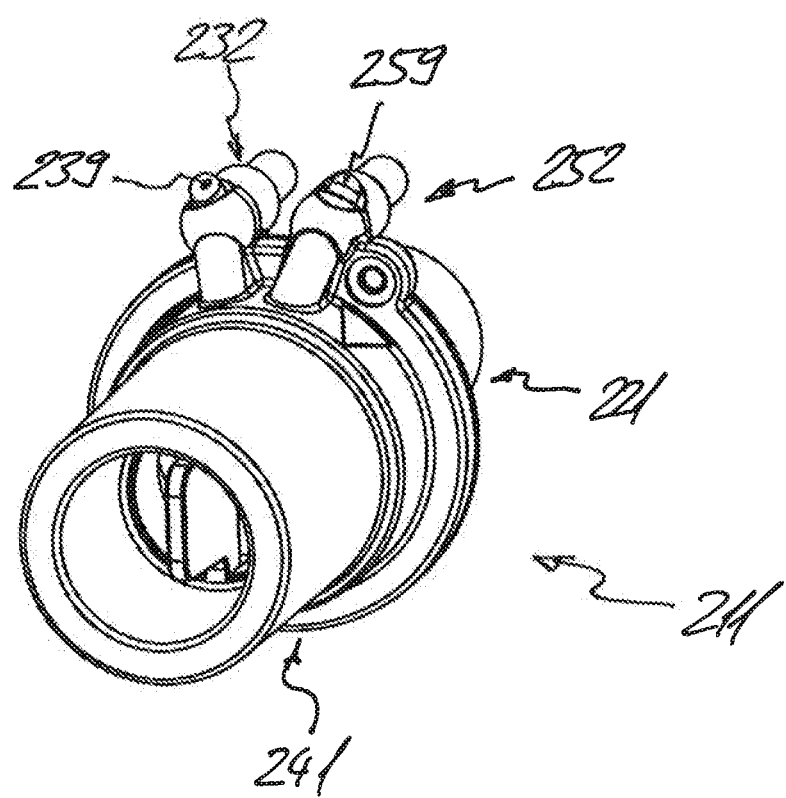
FIG. 20 shows the respiratory flow sensor according to FIG. 10 in a further perspective representation.

FIG. 20 shows jointed respiratory flow sensor 211, wherein tool openings 236 and 256 at tube portions 239 and respectively 259 are represented closed. The latter have been closed gas-tight in an ultrasonic welding procedure with an ultrasonic welding device.

REFERENCE LIST 11 respiratory flow sensor
12 flow tube
13 flow channel
14 longitudinal axis of 12
16 the end of 12
17 tube port
18 free end of 12
19 tube port
21 1st flow tube portion
22 cylindrical portion
23 guide element
24 open end of 21
26 widening portion
27 flange
27a $1^{st}$ port recess
27b $1^{st}$ support structure
28 $1^{st}$ circumferential part of a groove/comb structure
29 contact face
30 cam
32 $1^{st}$ port
32a support portion of 32
33 connecting line portion
34 further connecting line portion
35 opening of 32
36 $1^{st}$ tool opening
37 groove structure
38 $1^{st}$ closure element
39 living hinge
40 comb structure
41 $2^{nd}$ flow tube portion
42 cylindrical portion
43 guide element
44 open end of 21
45 free end of 43
46 enlarged portion
47 flange
47a further port recess
47b further support structure
48 $2^{nd}$ circumferential part of a groove/comb structure
49 contact face
50 hole
51 receiving recess
52 $2^{nd}$ port
52a support portion of 52
53 connecting line portion
54 further connecting line portion
55 opening of 32
56 $2^{nd}$ tool opening
57 groove structure
58 $2^{nd}$ closure element
59 living hinge
60 comb structure
61 flow resistor
62 recesses of 61
α angle between 33 and 34
β angle between 53 and 54
71 respiration adapter
72 respiratory device
73 $1^{st}$ connecting tube
74 $2^{nd}$ connecting tube
76 measuring device/respiratory device
77 $1^{st}$ breathing tube
78 mouthpiece
79 $2^{nd}$ breathing tube
81 $1^{st}$ flow tube portion
82 $1^{st}$ port
83 connecting line portion
84 further connecting line portion
85 opening of 82

86 open end of 81
91 1st flow tube portion part
93 2nd flow tube portion part
101 2nd flow tube portion
102 2nd port
112 air diversion
113 hollow space of 112
114 free end of 101
116 contact section
117 contact section
121 1st flow tube portion
124 longitudinal axis
132 1st port
133 connecting line portion
134 further connecting line portion
141 2nd flow tube portion
152 2nd port
153 connecting line portion
154 further connecting line portion
211 respiratory flow sensor
212 flow tube
213 flow channel
214 longitudinal axis
218 free end of 212
221 1st flow tube portion
222 cylindrical portion
223 guide element
224 open end of 212
226 widening portion
227 flange
227a 1st port recess
227b 1st support structure
232 1st port
232a support portion of 232
233 connecting line portion
234 further connecting line portion
235 opening
236 1st tool opening
238 1st closure element
239 tube portion
241 2nd flow tube portion
242 cylindrical portion
243 guide element
244 open end
245 free end of 241
246 widening portion
247 flange
247a further port recess
247b further support structure
252 2nd port
252a support portion of 252
253 connecting line portion
254 further connecting line portion
255 opening
256 2nd tool opening
258 closure element
259 tube portion
γ angle between 133 and 134
δ angle between 153 and 154.

What is claimed is:

1. A respiratory flow sensor comprising:
a flow tube having a longitudinal axis;
a first flow tube portion;
a second flow tube portion;
a flow resistor arranged in the flow tube between the first flow tube portion and the second flow tube portion; and
ports for extracting a pressure difference generated by the flow resistor, wherein a first port opens into the first flow tube portion and a second port opens into the second flow tube portion, wherein the first and second ports each have
a first connecting line that runs essentially parallel to the longitudinal axis of the flow tube, and
a second connecting line that connects with the first connecting line at an angle,
wherein the first connecting line of the first port is parallel to the first connecting line of the second port and at least one opening at a terminal end of the ports is aligned in a same direction of a patient mouthpiece or breathing mask connection and away from a direction of a respiratory device connection, wherein the first port is arranged at the first flow tube portion and the second port is arranged at the second flow tube portion.

2. The respiratory flow sensor according to claim 1, wherein the second connecting line of the first port encloses an angle (α) of 40° to 70°, with the first connecting line of the first port.

3. The respiratory flow sensor according to claim 2, wherein the second connecting line of the second port encloses an angle (β) of 130° to 160°, with the first connecting line of the second port that runs essentially parallel to the longitudinal axis of the flow tube.

4. The respiratory flow sensor according to claim 1, wherein the second connecting line of the second port encloses an angle (β) of 130° to 160°, with the first connecting line of the second port that runs essentially parallel to the longitudinal axis of the flow tube.

5. The respiratory flow sensor according to claim 1, wherein the first port is arranged adjacent to the second port and the first port is also arranged spaced apart from the second port.

6. The respiratory flow sensor according to claim 1, wherein the first port is arranged at least in sections at an outer lateral surface of the first flow tube portion and the second port is arranged at least in sections at a lateral surface of the second flow tube portion.

7. The respiratory flow sensor according to claim 1, wherein the first flow tube portion and the second flow tube portion each comprises an essentially cylindrical portion and a radially widening portion, wherein the radially widening portion becomes larger towards an open end of the respective first flow tube portion or of the second flow tube portion, and a radially projecting flange with a contact face is provided in each case at the open end of the first flow tube portion and of the second flow tube portion.

8. The respiratory flow sensor according to claim 7, wherein a second port recess for receiving the second port of the second flow tube portion at least in sections is present at the radially widening portion of the first flow tube portion and a first port recess for receiving the first port of the first flow tube portion at least in sections is present at the radially widening portion of the second flow tube portion.

9. The respiratory flow sensor according to claim 1, wherein a tool opening is provided for removing a moulding tool for moulding of the second connecting lines of the first and second ports, and wherein first and second plugs are provided for closing the tool opening of the first and second ports, respectively, wherein the first plug is arranged at the first flow tube portion and wherein the second plug is arranged at the second flow tube portion.

10. The respiratory flow sensor according to claim 9, wherein the first plug is arranged at the first flow tube portion in a swivellable manner by means of a hinge, and the second plug is arranged at the second flow tube portion in a swivellable manner by means of a hinge.

11. The respiratory flow sensor according to claim 10, wherein groove or comb structures are provided at the tool openings or the plugs; and the plugs are fixed at the respective flow tube portion for a closure of the tool openings by means of a connection that connects in a sealing manner.

12. The respiratory flow sensor according to claim 9, wherein groove or comb structures are provided at the tool openings or the plugs; and the plugs are fixed at the respective flow tube portion for a closure of the tool openings by means of a connection that connects in a sealing manner.

13. The respiratory flow sensor according to claim 2, wherein the second connecting line of the first port encloses an angle ($\alpha$) of 48° to 62°.

14. The respiratory flow sensor according to claim 13, wherein the second connecting line of the first port encloses an angle ($\alpha$) of 52° to 58°.

15. The respiratory flow sensor according to claim 3, wherein the second connecting line of the second port encloses an angle ($\beta$) of 138° to 152°.

16. The respiratory flow sensor according to claim 15, wherein the second connecting line of the second port encloses an angle ($\beta$) of 142° to 148°.

17. The respiratory flow sensor according to claim 4, wherein the second connecting line of the second port encloses an angle ($\beta$) of 138° to 152°.

18. The respiratory flow sensor according to claim 17, wherein the second connecting line of the second port encloses an angle ($\beta$) of 142° to 148°.

19. The respiratory flow sensor according to claim 11, wherein the plugs are fixed by means of ultrasonic welding.

20. The respiratory flow sensor according to claim 12, wherein the plugs are fixed by means of ultrasonic welding.

* * * * *